United States Patent [19]

Wells et al.

[11] Patent Number: 4,619,051

[45] Date of Patent: Oct. 28, 1986

[54] PROCESS FOR DRYING POLYMERIC BEADS AND ASSOCIATING SHADING PIGMENTS THEREWITH

[75] Inventors: Laura M. Wells, Mt. Prospect; Fred D. Hawker, Villa Park; Maryam L. Dachniwskyj; Charles W. Strobel, both of Schaumburg, all of Ill.

[73] Assignee: DeSoto, Inc., Des Plaines, Ill.

[21] Appl. No.: 794,431

[22] Filed: Nov. 4, 1985

Related U.S. Application Data

[62] Division of Ser. No. 658,625, Oct. 9, 1984, Pat. No. 4,599,807.

[51] Int. Cl.$^4$ ............................................. F26B 3/00
[52] U.S. Cl. ...................................................... 34/9
[58] Field of Search ............................................ 34/9

[56] References Cited

U.S. PATENT DOCUMENTS

| | | | |
|---|---|---|---|
| 2,138,049 | 11/1938 | Vesce | 34/9 |
| 2,503,913 | 4/1950 | Kimberlin, Jr. et al. | 34/9 |
| 3,879,314 | 4/1975 | Gunning et al. | 521/62 |

FOREIGN PATENT DOCUMENTS 318937  9/1929  United Kingdom .

*Primary Examiner*—John J. Camby
*Attorney, Agent, or Firm*—Dressler, Goldsmith, Shore, Sutker & Milnamow, Ltd.

[57] ABSTRACT

A process for drying a water-wet paste containing polymeric beads without agglomeration is disclosed in which there is added to the wet paste a proportion of an organic solvent which forms an azeotrope with water, such as methyl isobutyl ketone, in an amount providing a stirrable mixture, and the solvent-containing aqueous paste is heated to remove the water as an azeotrope with the solvent and to produce a water free suspension of the beads in organic solvent. The proportion of azeotropic solvent can be minimized by adding a resinous vehicle in organic solvent solution to the solvent-containing aqueous paste after substantially all the water has been removed, and continuing the application of heat to remove undesired organic solvent and thereby increase the solids content. As a feature of the invention, a pigment which is incompatible with the azeotropic solvent, such as an aqueous dispersion of lamp black, is added to the aqueous paste either before or after the addition of azeotropic organic solvent to be present while the water is azeotropically removed to avoid flooding.

4 Claims, No Drawings

PROCESS FOR DRYING POLYMERIC BEADS AND ASSOCIATING SHADING PIGMENTS THEREWITH

This application is a Division of Ser. No. 658,625 filed Oct. 9, 1984 now U.S. Pat. No. 4,599,807.

DESCRIPTION

1. Technical Field

This invention relates to polymeric beads, which may be pigmented and/or vesiculated, which must be dried to remove water therefrom to enable use in various coating compositions, especially two-component urethane coating compositions. More particularly, the invention involves the removal of water from aqueous pastes containing such beads to provide largely unfragmented beads, and to the inclusion of shading pigments into coating formulations containing the dried beads while avoiding flooding problems which cause an uneven pigmentation.

2. Background Art

Coating compositions must frequently be pigmented to introduce desired opacity and coloration. It is desirable to provide the needed opacity by incorporating into the coating composition an appropriate proportion of polymeric beads, such as vesiculated beads, either alone or together with other pigments, opacifying agents or colorants. These beads are normally produced in aqueous suspension. The suspension is drained of excess water to produce an aqueous paste or cake which contains surfactants and/or protective colloids as part of the process of producing the beads. When this paste is dried, as in a forced air oven, the surfactants and/or colloids used to form the beads concentrate on the beads causing them to form agglomerates.

The undesired adhesion can be overcome by grinding, as in a ball mill, but grinding fractures the beads, and the extent of fracture is not fully predictable. Excessive grinding can produce excessive fracturing, and this increases the gloss of the final paint so that it does not meet the specifications which it was intended to satisfy. The grinding step thus introduces expense, reduces the particle size, and the grind must be carefully monitored to provide as much reproducibility as possible.

Even after one has successfully ground the dried beads, it is difficult to formulate the dried beads into an organic solvent solution coating composition together with pigments having poor affinity for the beads, such as some commercially available lamp black dispersions. These pigments are used for shading, and when they do not associate well with the beads, it causes a problem called flooding in which the added pigment tends to float on the deposited coating. The result is an uneven deposit of the shading pigment when coating is attempted, and an unevenly pigmented coated product. This is obviously unacceptable.

This invention attempts to overcome these problems by providing a process of removing water which avoids the undesired agglomeration previously encountered. Since there are no agglomerates to remove, grinding becomes unnecessary. Since there is no grinding step, variation in fragmentation is eliminated and the possibility of excessive fragmentation is avoided. As a feature of this invention, a procedure is provided which associates the pigment with the beads. As a result, the pigment does not separate in the solvent-based coating compositions, thus eliminating the flooding problem of the prior art.

DISCLOSURE OF INVENTION

In accordance with this invention, a process for removing water from water-wet paste containing beads (which are preferably vesiculated) without agglomeration of the beads comprises, adding to the wet paste a proportion of an organic solvent which forms an azeotrope with water in an amount providing a stirrable mixture, and heating the solvent-containing aqueous paste to remove the water as an azeotrope with the solvent and obtain a suspension of the beads in residual organic solvent.

The water-wet paste which is treated in this invention is formed when excess water is drained from the aqueous suspension obtained when the beads were prepared in aqueous suspension, a surfactant and/or protective colloid being needed to maintain the suspension while the beads are produced. A typical paste is called a cake, and it contains about 65% water while appearing to be dry. If this residual water is removed by simple evaporation, the surfactant and/or protective colloid concentrates on the beads to cause the agglomeration which troubled the prior art. By using azeotropic solvent and directly producing a suspension of the beads in water free solvent without ever drying the composition, the surfactant and colloid used to form the beads do not cause the beads to agglomerate.

While azeotropic solvents which can tolerate significant amounts of water can be used, like methyl ethyl ketone, the preferred solvents are water immiscible, such as methyl isobutyl ketone. Sufficient organic solvent is added to the aqueous paste to provide a stirrable slurry and sufficient solvent to enable azeotropic water removal. At least 25% solvent, based on the weight of the paste, preferably at least 30%, is desirable. In normal practice, the solvent and paste are combined in a weight ratio of 0.5:1 to 10:1, but preferably about equiweight amounts, though a smaller solvent ratio is used when there is more water.

It is desired to minimize the proportion of azeotropic solvent which remains in the suspension which is formed. This is accomplished by adding a resinous vehicle in organic solvent solution to the solvent-containing aqueous paste after almost all of the water has been removed. This avoids hydrolysis of the resin by the water. The azeotropic solvent can then be at least partially removed to minimize its presence in the bead containing resin solution.

As a feature of this invention, a pigment which is incompatible with the azeotropic organic solvent, preferably a water-based pigment, such as lamp black, is added to the aqueous paste either before or after the addition of organic azeotropic solvent to be present while the water is azeotropically removed. This causes the added pigment to adhere to the surface of the beads and thus avoids flooding difficulties.

To amplify the foregoing, the beads, such as vesiculated beads, are produced in an aqueous suspension which is drained to form a water-wet paste. The procedure for producing these beads involves polymerization in aqueous medium in the presence of surfactants and, preferably also, protective colloids. Protective colloids such as polyvinyl alcohol and hydroxyethyl cellulose are frequently used and are particularly troublesome.

In normal practice, one drains away as much water as will leave of its own accord, and this provides a paste which is too viscous to stir. Sufficient azeotropic organic solvent is then added to provide a stirrable mixture and to introduce enough solvent to allow azeotropic removal of the water in admixture with the solvent. Economy of operation suggests draining away as much water as possible and using as little added solvent as possible. While water miscible solvents can be used, the solvent is desirably water immiscible so that, when condensed, it can be easily separated from the water and recycled. As the process proceeds, the vapors which are produced become richer and richer in solvent and, when the boiling point of water is reached, it is concluded that substantially all of the water has been removed.

As previously indicated, it is desired to minimize the proportion of azeotropic organic solvent which remains in the slurry which is produced. This is done by adding a resinous vehicle in solution in an organic solvent to the mixture which is heated to azeotrope away the water. The resinous vehicle will be illustrated more hereinafter. The solvent in which that resin is dissolved may be the same as or different from the azeotropic solvent, but it is preferably different and of higher boiling point than the azeotropic solvent so further heating will preferentially remove the azeotropic solvent. This procedure is illustrated by an azeotropic solvent like methyl isobutyl ketone, and a vehicle in which the resin is dissolved in methyl amyl ketone which is of higher boiling point.

Since the product ultimately desired includes solvent, resin and opacifying beads, if the solvent slurry of beads produced by azeotropically removing the water is added to a solution containing the resin, there will be two sources of solvent, and more solvent than desired. The addition of resinous vehicle in this invention allows a greater proportion of azeotropic solvent to be removed before the slurry product produced by azeotroping away solvent and water becomes too viscous to handle. This increases the solids content of the final solvent suspension containing both dissolved resin and opacifying beads.

When pigments which are poorly compatible with the azeotropic solvent, such as lamp black, are added to the aqueous paste, either before or after the addition of organic solvent, so as to be present while the water is azeotropically removed, it is found that the the flooding difficulties which were previously encountered are overcome. This is because this procedure causes the pigment to adhere to the surface of the beads, thus preventing subsequent separation.

The organic solvents which form azeotropes with water and which can be used for removing water in accordance with this invention are themselves well known. Azeotropic solvent which possess significant water miscibility are illutrated by methyl ethyl ketone. The preferred azeotropic solvents which are water immiscible are illustrated by toluene, methyl isobutyl ketone, methyl amyl ketone, mineral spirits and butyl acetate.

The resinous vehicles which are used in this invention are not important to this invention. Organic solvent-soluble resins which are reactive with isocyanate functionality for cure are particularly benefited. Hydroxy-functional resins are preferred, like hydroxy-functional polyester resins which are illustrated by polyesters of phthalic anhydride and glycerine, or hydroxy-functional addition copolymers of monoethylenically unsaturated monomers which are illustrated by copolymers of styrene and allyl alcohol and partially hydrolyzed copolymers of vinyl chloride and vinyl acetate. All of these are available in commerce. The resin which is used to form the pigmented resin solution is thus not itself a feature of this invention, and any soluble resin may be used. The literature is filled with illustrations of soluble resins which cannot tolerate water, and this includes polyisocyanate-curing two-package coating compositions. This invention is applicable to the pigmentation of any of these prior art compositions.

It is stressed that the problem is water. Water is poorly tolerated in many organic solvent-based coating compositions, both thermoplastic and thermosetting. Water causes difficultly in all sorts of solvent solution coating compositions, and it is entirely ruled out in isocyanate-curing compositions because water is independently reactive with isocyanate functionality. Indeed, solvents to be used in isocyanate-containing systems must be water free to the point that water free solvents are commonly described as being of isocyanate grade.

The invention is illustrated in the examples which follow. All parts and proportions herein are by weight unless otherwise specified.

EXAMPLE 1

An aqueous slurry of vesiculated beads (see note 1) has the bulk of its water content removed by decantation to provide an aqueous paste (termed a beadcake) containing 35 parts of vesicular beads, 64.5 parts water, 00.18 parts of a 75% solution of sodium dioctyl sulfosuccinate (the American Cyanamid surfactant, Aerosol OT may be used), 00.28 parts polyvinyl alcohol and 00.04 parts hydroxy ethyl cellulose. These surfactants and colloids are typical residues of bead production and they would cause agglomeration if the water were removed by simple drying. The vesiculated beads are composed of 56.0% resin and 44.0% titanium dioxide. The bead resin is an unsaturated polyester containing propylene glycol/maleic anhydride/phthalic anhydride in proportions of 3.72/2.06/4.22, and this polyester is dissolved in styrene to provide a 58/42 ratio of styrene to polymers. To form the beads, the mixture of polyester and styrene is dispersed in water with the aid of surfactants and protective colloids in the proportions noted and copolymerized in the presence of a quaternary ammonium salt to cause vesicles to form as described in U.S. Pat. No. 3,879,314. The resulting vesiculated beads are in water slurry, and this is drained to provide the beadcake starting material.

Equal proportions, 790 pounds of each, of the beadcake described above and methyl isobutyl ketone are charged to a reactor with agitation to create a slurry having a solids content of 17.5%. 11.8 pounds of a 53% solids lampblack dispersion are then added to the slurry to provide desired coloration. Heat is applied to the reactor, and water distills over when the reactor temperature reaches approximately 92° C. The solvent is returned to the reactor and the distilled water is collected and removed. When the reactor temperature reaches 100° C., it is concluded that all of the water has been removed. 528 pounds of a solution of polyester resin (the Mobay product Desmophen 221 may be used) having a solids content of 70% in methyl amyl ketone are added to the reactor and heat is continued to cause the reactor contents to reflux for 30 minutes to insure that all of the water has been removed. The temperature is then further increased to remove methyl isobutyl ketone until the solids content of the final resin solution is 59%.

The product is now a resin solution which has been pigmented with vesiculated beads which have not been fractured and which are not agglomerated.

The lampblack in the above example is an optional component and is only added for shading. It will be understood that shading is not always required, and that many different materials may be used depending on the shade which is desired.

The polyester solution is also optional since it allows the proportion of solvent to be reduced to where the solids content is 59%, as previously noted. However, if the resin solution is simply stirred into the solvent slurry produced without addition of resin solution, a satisfactory product is again obtained, albeit the solids content is not as high.

What is claimed is:
1. A process for drying a water-wet paste containing vesiculated polymeric beads without agglomeration comprising, adding to said wet paste a proportion of an organic solvent which forms an azeotrope with water in an amount providing a stirrable mixture, and heating the solvent-containing aqueous paste to remove the water as an azeotrope with said solvent and to produce a water free suspension of said beads in organic solvent.
2. A process as recited in claim 1 in which said organic azeotropic solvent is water immiscible.
3. A process as recited in claim 1 in which azeotropic organic solvent is added to the aqueous paste in an amount to provide a ratio of solvent to paste of from 0.5:1 to 10:1.
4. A process as recited in claim 1 in which said azeotropic solvent is methyl isobutyl ketone.

* * * * *